(12) United States Patent
Parr

(10) Patent No.: US 6,234,733 B1
(45) Date of Patent: May 22, 2001

(54) CARGO-RETAINING DEVICE FOR AUTOMOBILES

(76) Inventor: Warren A. Parr, 2015 Fair River Ct., Suwanee, GA (US) 30024

( * ) Notice: Subject to any disclaimer, the term of this patent is extended or adjusted under 35 U.S.C. 154(b) by 0 days.

(21) Appl. No.: 09/231,688

(22) Filed: Jan. 14, 1999

(51) Int. Cl.[7] .................................................. B60P 7/14
(52) U.S. Cl. ........................... 410/94; 410/118; 410/121; 410/129
(58) Field of Search ................................ 410/94, 95, 117, 410/118, 121, 129; 224/42.33, 42.34; 296/37.5, 37.6, 39.2, 24.1; 220/520, 530, 531, 551, 557; 248/354.1

(56) References Cited

U.S. PATENT DOCUMENTS

| | | |
|---|---|---|
| 3,986,656 | 10/1976 | November . |
| 4,838,745 | 6/1989 | Haydock . |
| 4,842,460 * | 6/1989 | Schlesch ............................. 410/121 |
| 4,884,733 | 12/1989 | Geeves . |
| 4,941,784 * | 7/1990 | Flament .............................. 410/121 |
| 4,951,867 | 8/1990 | McManus . |
| 5,065,922 | 11/1991 | Harris . |
| 5,215,205 | 6/1993 | Behlman . |
| 5,230,690 | 7/1993 | Adkinson . |
| 5,505,358 | 4/1996 | Haase . |
| 5,518,170 | 5/1996 | Rasmussen . |
| 5,570,921 | 11/1996 | Brooker . |
| 5,662,305 * | 9/1997 | Shimamura et al. ................. 248/500 |
| 5,709,512 * | 1/1998 | Smith ................................. 410/129 |
| 5,865,580 * | 2/1999 | Lawrence ............................ 410/118 |
| 6,089,803 * | 7/2000 | Holland .............................. 410/129 |
| 6,109,847 * | 8/2000 | Patel et al. ......................... 410/129 |

FOREIGN PATENT DOCUMENTS

| | | |
|---|---|---|
| 3742540 | 6/1989 | (DE) . |
| 408930 * | 1/1991 | (EP) ............................... 224/42.33 |
| 2197274 | 5/1988 | (GB) . |
| 2229982 | 10/1990 | (GB) . |

* cited by examiner

*Primary Examiner*—Stephen T. Gordon
(74) *Attorney, Agent, or Firm*—Technoprop Colton LLC

(57) ABSTRACT

A foldable cargo-retaining device used to limit the movement of articles in the trunk space of an automobile formed using a plurality of panels pivotably joined together to form various shapes with no top or bottom panel. Hook and loop fastener, or similar fastening means, is lined on the bottom edge of the panels for attaching the device to the carpet of an automobile, thereby restricting movement of the device. Articles then can be secured inside of the device to ensure limited immobility of said articles. The panels preferably are constructed from one piece of material with fold lines to produce connecting panels with one corner seam having hook and loop fastener or similar fastening means attached thereto, this allowing the closed device to be disconnected at the seam and opened up into one of many different shaped configurations for attachment to the bottom and side walls of an automobile trunk or cargo area. When not in use, the rectangle can be folded into a compact unit for storage.

20 Claims, 4 Drawing Sheets

CARGO-RETAINING DEVICE FOR AUTOMOBILES

TECHNICAL FIELD

This invention relates generally to cargo retaining systems, and, more specifically, to a collapsible cargo retaining system used on carpeted surfaces of an automotive vehicle.

BACKGROUND ART

For many individuals, automobiles are utilized to transport more than just adults, children and soccer equipment. A multitude of items, such as groceries, automobile safety equipment, toys, first aid equipment and/or other sporting goods, typically can be found in an automobile. However, many of these items can be damaged and/or cause damage to the interior of an automobile by sliding around uncontrollably during driving and thus striking the interior portions of the automobile cargo area.

In an attempt to remedy this problem, several devices have been proposed. Examples of such devices may be found by reference to U.S. Pat. No. 3,986,656 to November, U.S. Pat. No. 4,838,745 to Haydock, U.S. Pat. No. 4,884,733 to Geeves, U.S. Pat. No. 5,065,922 to Harris, U.S. Pat. No. 5,215,205 to Behlman, U.S. Pat. No. 5,230,690 to Adkinson et al., U.S. Pat. No. 5,505,358 to Haase, U.S. Pat. No. 5,518,170 to Rasmussen, U.S. Pat. No. 5,570,921 to Brooker, U.K. Patent No. 2,197,274 to Dudley, U.K. Patent No. 2,229,982 to Svendsen and German Patent No. 3,742,540 to Heinrich. In general, however, these designs are disadvantageous. For example, many do not provide adequate means for securing the actual device within the cargo area. Thus, they do not restrict the overall movement of the storage device in the cargo area, which in turn would not restrict the overall movement of the cargo. In addition, many of the designs are limited in configuration to generally rectangular or parallelogramical shapes, and thus may not provide the best constraint for the widest array of cargo. Also, many of these devices are bulky and expensive to manufacture.

It is readily apparent that an improved and affordable cargo retaining device is needed that is releasably adherable to carpet, provides the ability to be shaped in a multitude of configurations and can be easily folded to a compact unit when not in use. It is, therefore, to the provision of such improvements that the present invention is directed.

BRIEF SUMMARY OF THE INVENTION

Briefly described, in a preferred embodiment, the present invention overcomes the above-mentioned disadvantages by providing a foldable automobile cargo retaining device used to store and retain loose items such as groceries, toys or safety equipment from free movement in the trunk space or cargo area of a vehicle while the vehicle is in motion. The cargo-retaining device is formed using two or more, preferably four, polyethylene, corrugated cardboard or plastic panels, or other similar material, pivotably joined together to form a an L-, triangular or rectangular shape with no top or bottom panel.

In a preferred embodiment, the panels are formed from one piece of generally elongated material having prepressed fold lines to define the panels. A connecting flap is formed proximal to one end of the material by including an additional prepressed fold line proximal to that end. Hook and loop fastener, or other similar fastening means, is sewn or glued to the connecting flap for adhering to one of the panels to form the desired configuration or to the side of the trunk or cargo area, thereby providing an additional means for securing the device in the desired position and shape. In an alternate embodiment, a second connecting flap having hook and loop fastener, or other similar fastening means, may be formed distal to the first connecting flap for providing additional means for connecting or securing the device. In a preferred embodiment, the panels are encased with carpet material glued or sewn around the panels to provide additional padding for the cargo, to provide additional points of connection for the hook and loop fasteners on the connecting flap and to add to the esthetical appeal of the device.

In using the preferred four-panel embodiment, the panels may be folded in a generally rectangular shape with the hook and loop fastener of the connecting flap proximal to the first panel adhering to the fourth panel to secure the device in the generally rectangular shape. Alternatively, the hook and loop fastener of the connecting flap may be adhered to a multitude of locations along the carpet covering of the four panels or to the side of the cargo area to form a plurality of shapes and sizes. For instance, the four panels may be folded to form an "L" shape, "U" shape, triangular shape or other suitable shape to conform to the shape of the cargo or the cargo area. Hook and loop fastener, or other similar fastening means, is lined on the bottom edge of the four panels for attaching the device to the carpet of an automobile trunk or cargo area, thereby restricting movement of the device. Articles can then be secured inside of the device to ensure restricted mobility of said articles. When not in use, the rectangle can be folded into a compact unit for convenient storage.

A feature and advantage of the present invention is to provide a new and improved collapsible cargo retaining system having a multitude of fold lines giving it the versatility to conform to a plurality of shapes and sizes, thus capable of restraining large, and/or irregular shaped cargo.

A feature and advantage of the present invention is to provide a new and improved collapsible cargo retaining system made from corrugated panels covered with carpet material to reduce shock to the articles retained if a sudden change in direction is encountered.

A feature and advantage of the present invention is to provide a new and improved collapsible cargo retaining system that assists in reducing driver distractions and damage to the vehicle cargo area from the movement of loose items in the cargo area.

A feature and advantage of the present invention is to provide a new and improved collapsible cargo retaining system covered with carpet material to provide an esthetically pleasing device.

A feature and advantage of the present invention is to provide a new and improved collapsible cargo retaining system that is lightweight and can be folded into a compact unit for easy storage when not in use.

Figure 1:
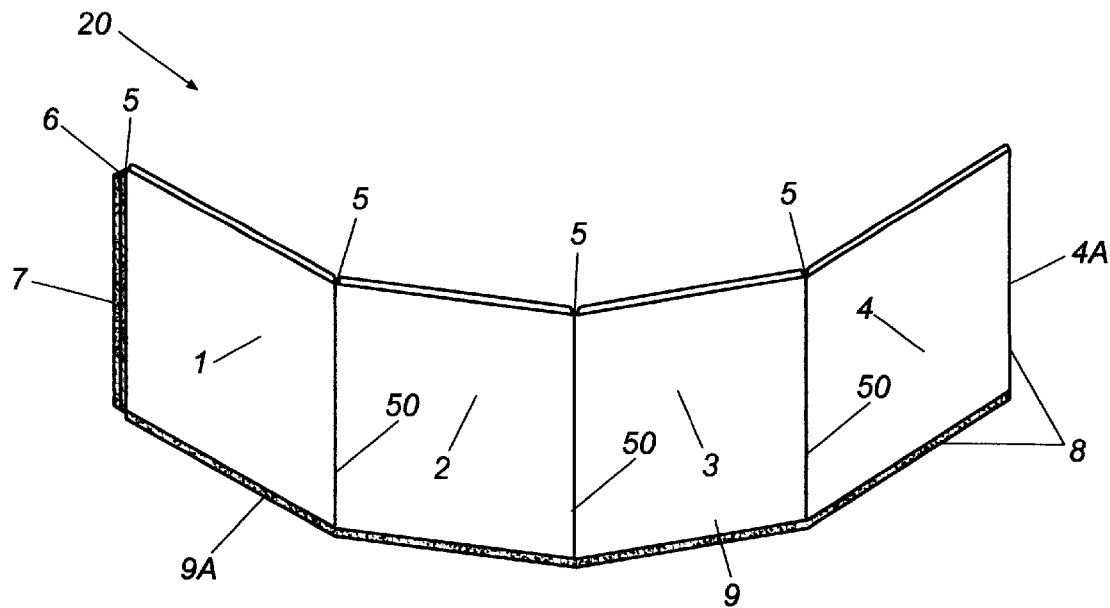
FIG. 1 is a perspective view of the present invention in the open configuration showing the four side panels according to a preferred embodiment.

It is to be noted that the drawings presented are intended solely for the purpose of illustration and therefore are neither desired nor intended to limit the invention to any or all of the exact details of construction shown, except insofar as they may be deemed essential to the claimed invention.

DETAILED DESCRIPTION OF THE PREFERRED EMBODIMENT

The preferred embodiment of the present invention is illustrated in FIGS. 1–6. As shown in FIGS. 1, 4A, 4B, 5A, 5B and 6, the cargo-retaining device is formed using two or more panels 1, 2, 3, 4 pivotably joined together at hinges 50 to form a walled device with no top or bottom panels. More specifically, referring now to FIG. 2, a preferred embodiment of cargo retaining device 20 comprises generally corrugated assembly 9, carpet material 10, adhesive 11 for connecting carpet material 10 to corrugated assembly 9, hook and loop fastening strip 8 and thread 12 for attaching hook and loop fastening strip 8 to cardboard assembly 9. The preferred corrugated assembly 9 material is either corrugated cardboard or corrugated plastic, although paper, paperboards, woods, metals, plastics, chipped boards, pressed boards, and other common materials may be used. The device 20 will be discussed in connection with corrugated cardboard.

Cardboard assembly 9 is formed from a generally elongated rectangular piece of corrugated cardboard material with a plurality of fold lines 5, as shown in FIG. 1. In a preferred embodiment, fold lines 5 section the material into four connecting panels 1, 2, 3, 4 and one connecting flap 6. Adhesive 11 is applied to cardboard assembly 9 to provide a means for attaching carpet material 10 to cardboard assembly 9. Cardboard assembly 9 is covered with carpet material 10 to increase its esthetic appeal, to provide additional padding for the retained cargo items and to provide a multitude of connection locations for connecting flap 6.

Figure 2:
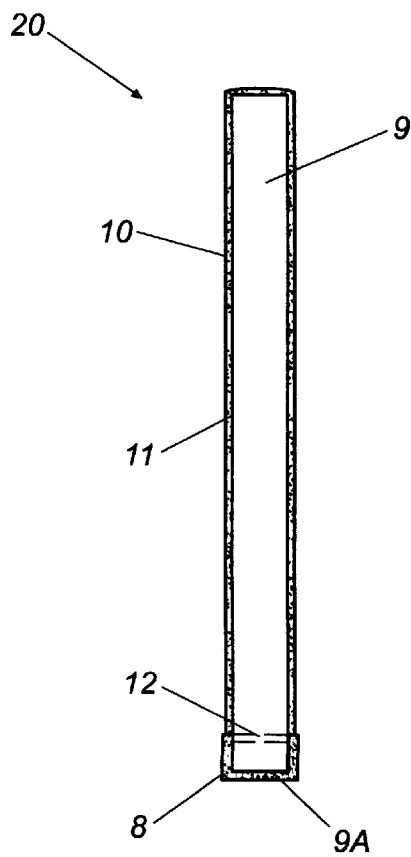
FIG. 2 is a cross section view of one of the panels of the present invention according to a preferred embodiment.
Figure 3:
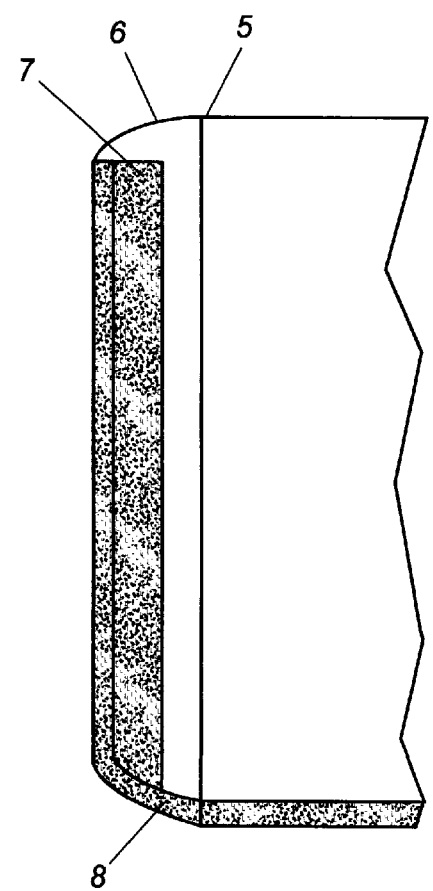
FIG. 3 is a view of the connecting flap of the present invention according to a preferred embodiment.

Referring now to FIG. 2, in a preferred embodiment, hook and loop fastener 8 having a width slightly greater than the bottom edge of cardboard assembly 9 is wrapped around the bottom edge 9A of cardboard assembly 9 and is sewn 12 through cardboard assembly 9. Additionally, referring to FIG. 3, hook and loop fastener 8 having a width slightly greater than the vertical edge of connecting flap 6 and panel 4 is sewn 12 through connecting flap 6 and through panel 4 at panel edge 4A. Vertically positioned on one side of connecting flap 6 adjacent to hook and loop fastener 8 is additional hook and loop fastener 7 sewn 12 thereto for providing a means for attaching connecting flap 6 to any of panels 2, 3, 4. It should be noted that alternate means for attaching hook and loop fastener 8, such as staples, glue or other similar methods, may be utilized. Furthermore, in an alternate embodiment, a second connecting flap may be formed at the panel edge 4A of panel 4 to provide additional means of securing device 20 in the desired position.

Figure 4A:
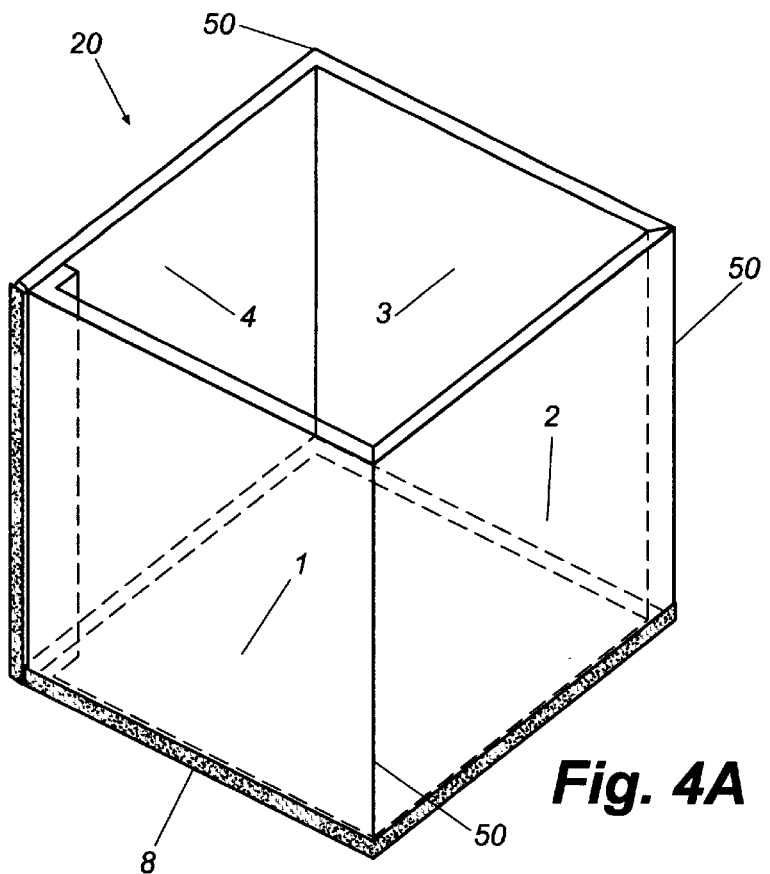
FIG. 4A is a perspective view of the present invention in a rectangular configuration according to a preferred embodiment.
Figure 4B:
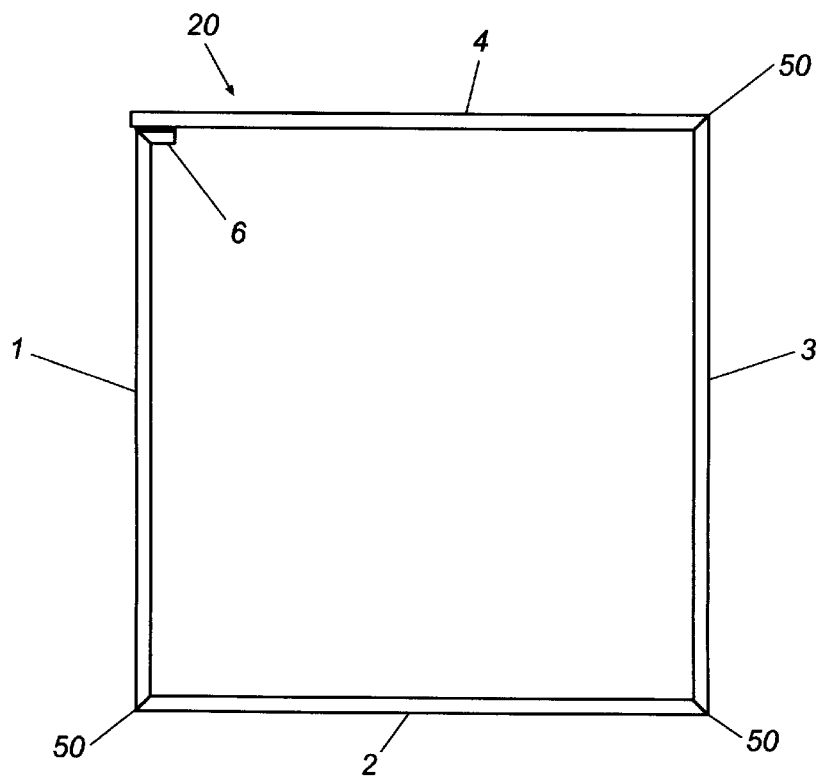
FIG. 4B is a top view of the present invention in a rectangular configuration according to a preferred embodiment.
Figure 5A:
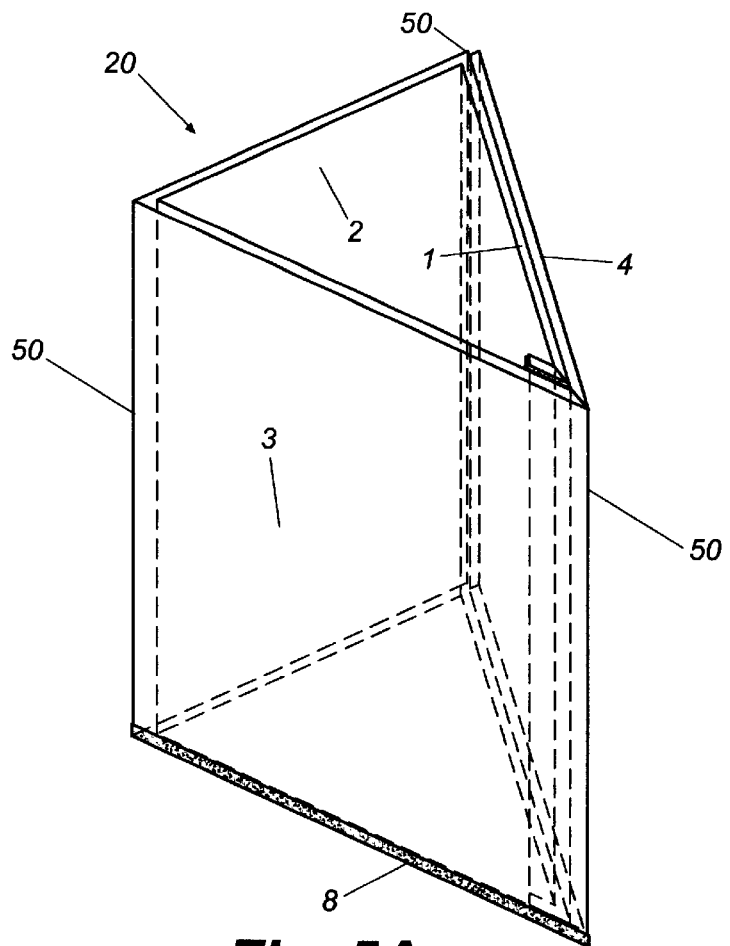
FIG. 5A is a perspective view of the present invention in a triangular configuration according to a preferred embodiment.
Figure 5B:
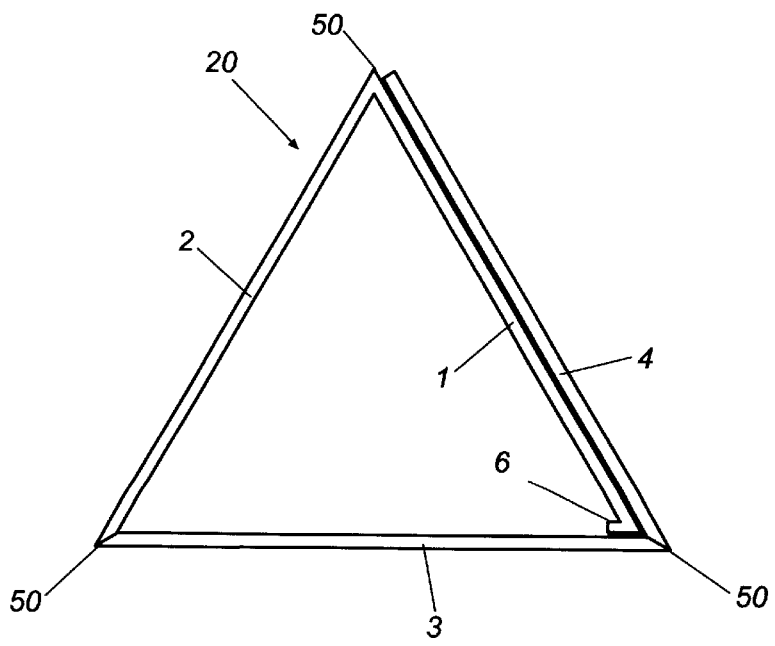
FIG. 5B is a top view of the present invention in a triangular configuration according to a preferred embodiment.
Figure 6:
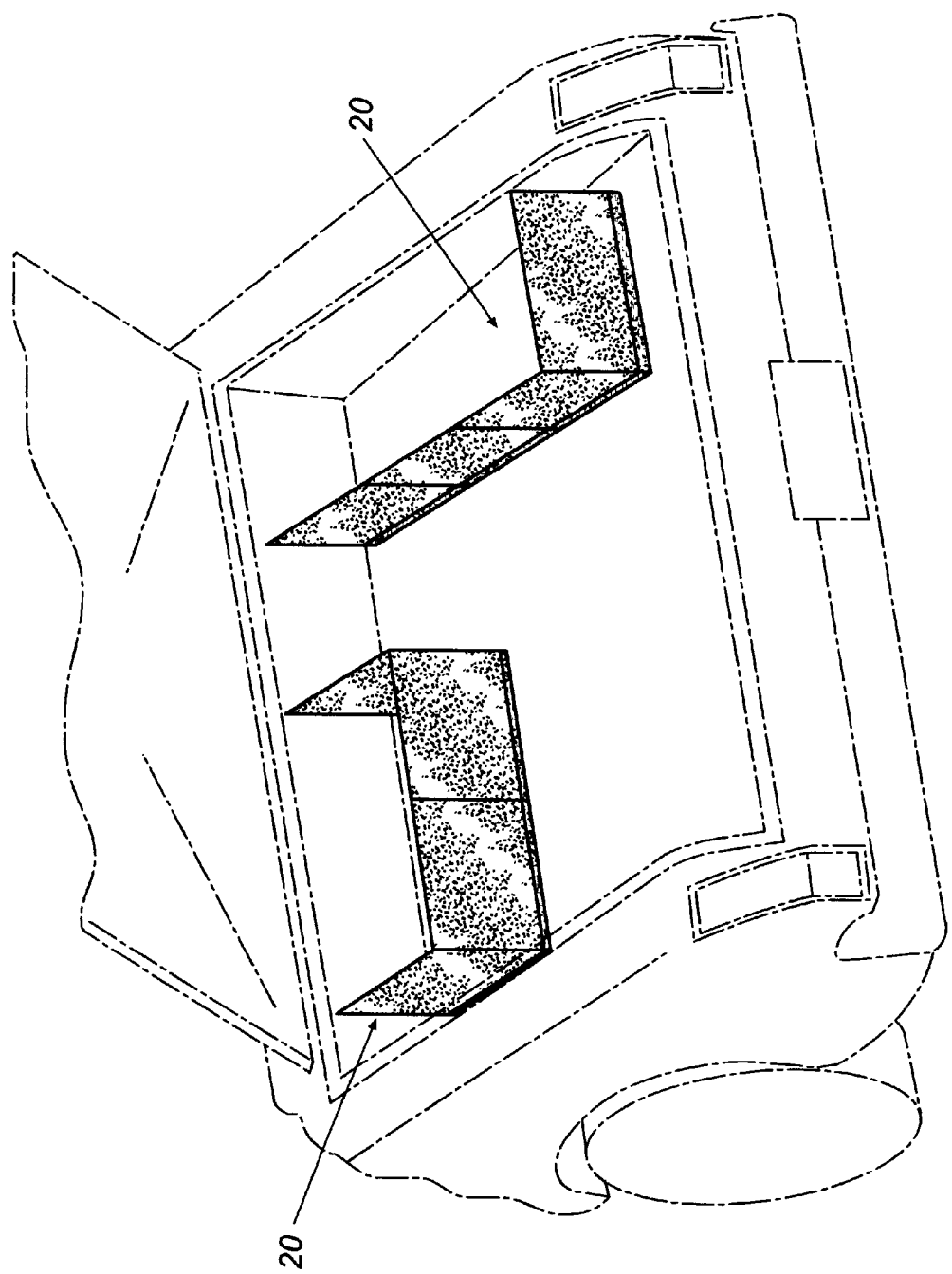
FIG. 6 is a perspective view of two configurations of the present invention in use in an automobile trunk according to a preferred embodiment.

Connecting flap 6 can be secured at any position on panels 3, 4 or to the carpeted area of the trunk or cargo space via hook and loop fastener to form a multitude of shapes. To work properly, the hook portion of hood and loop fastener should be attached to connecting flap 6, panel edge 4A, and to bottom edge 9A. The hook portion typically will grasp or releasably adhere to common carpet material such as found in an automobile's trunk. Because there is no bottom panel, device 20 can be bent about fold lines 5 to form a square as shown in FIGS. 4A and 4B, a triangle as shown in FIGS. 5A and 5B, an "L"-shape, a "U"-shape, or other form fitting shape. Once the desired shape is formed, device 20 may be secured to the trunk or cargo area by firmly pressing hook and loop fastener 8 of the bottom edge of cardboard assembly 9 against the bottom of the cargo area of the vehicle, as shown in FIG. 6. Depending on the desired shape, hook and loop fastener 8 located on the vertical edge 4A of panel 4 and connecting flap 6, can be attached to the carpeted sides of the trunk or cargo area to provide additional securing means.

It should be noted that additional fold lines may be incorporated to form a multitude of panels, thereby allowing the formation of numerous shapes. Likewise, there is no specific size requirement or preference for the device 20. It is contemplated that the device 20 may be of several different sizes so as to fit various size trunks and cargo areas. It also is contemplated that the device 20 may be sizable, such that a single device 20 of one size may be resized, such as by cutting, bending, folding or the like, so as to fit in various dimensioned trunks or cargo areas.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited to the specific embodiments as illustrated herein, but is only limited by the following claims.

What is claimed is:

1. A device for retaining cargo items within a cargo space of a vehicle, comprising:
   a. a plurality of panels each having a first edge, a second edge, a top edge and a bottom edge, said plurality of panels comprising at least a first panel and an end panel, wherein the second edge of said first panel is pivotably connected to the first edge of another of said plurality of panels;
   b. a connecting flap, said connecting flap pivotably connected to said first edge of said first panel;
   c. means carried by said connecting flap for removably attaching said connecting flap to said end panel, wherein said plurality of panels may be folded to form a multitude of shapes to accommodate the shape and size of the retained cargo; and
   d. means carried by the bottom edges of said plurality of panels for removably attaching said plurality of panels to the cargo space of the vehicles wherein said plurality of panels forms at least a partial perimeter for retaining the cargo items.

2. The device of claim 1, wherein said means for removably attaching said connecting flap is the hook portion of hook and loop fastener.

3. The device of claim 1, wherein said means for removably attaching said plurality of panels is the hook portion of hook and loop fastener.

4. The device of claim 1, further comprising an intermediate panel, also having a first edge, a second edge, a top edge and a bottom edge, located between said first panel and said end panel, wherein the second edge of said first panel is pivotably connected to the first edge of said intermediate panel, and the second edge of said intermediate panel is pivotably connected to the first edge of said end panel.

5. The device of claim 1, further comprising at least two intermediate panels, each of said at least two intermediate panels having a first edge, a second edge, a top edge and a bottom edge, wherein said at least two intermediate panels being located between said first panel and said end panel in a second-edge-to-first-edge pivotal connection manner, wherein the first edge of each successive panel is pivotably connected to the second edge of the panel immediately prior to each successive panel.

6. The device of claim 1, wherein said plurality of panels are made from cardboard material.

7. The device of claim 1, wherein said plurality of panels are made from polyethylene material.

8. The device of claim 1, wherein said plurality of panels are formed by fold lines creased in a single sheet of material.

9. The device of claim 1, further comprising an outer layer of carpet carried on said plurality of panels.

10. The device of claim 1, wherein said bottom edge of at least one of said plurality of panels adheres to a surface of a cargo space in the vehicle.

11. A device for retaining cargo items within a cargo space of a vehicle, comprising:
   a. a plurality of panels each having a first edge, a second edge, a top edge and a bottom edge, said plurality of panels comprising at least a first panel and an end panel, said first edge of one of said plurality of panels is pivotably connected to said second edge of one of said plurality of panels consecutively until all of said plurality of panels are pivotably connected, wherein said first edge of said first panel and said second edge of said end panel remain unconnected to said plurality of panels, and wherein said first edge of said first panel defines a first end to said plurality of panels and said second edge of said end panel defines a second end to said plurality of panels;
   b. a connecting flap, said connecting flap pivotably connected to said first edge of said first panel;
   c. means carried by said connecting flap for removably attaching said connecting flap to said plurality of panels, wherein said plurality of panels may be folded and secured by said connecting flap to form a multitude of shapes to accommodate the shape and size of the retained cargo;
   d. means carried by said plurality of panels for removably attaching said plurality of panels to the cargo space of the vehicle; and
   e. an outer layer of carpet carried on said plurality of panels.

12. The device of claim 11, wherein said means for removably attaching said connecting flap is the hook portion of hook and loop fastener.

13. The device of claim 11, wherein said means for removably attaching said plurality of panels is the hook portion of hook and loop fastener.

14. The device of claim 10, wherein said surface of the cargo space and said plurality of panels forms said at least partial perimeter for retaining cargo.

15. The device of claim 11, wherein said plurality of panels are made from a material selected from the group consisting of cardboard, paper, plastic, wood, pressed board, chip board, metal, and polyethylene material.

16. The device of claim 11, wherein said plurality of panels are formed by fold lines creased in a single sheet of material.

17. A device for retaining cargo items within a cargo space of a vehicle, comprising:
   a. a plurality of panels each having a first edge, a second edge, a top edge and a bottom edge, said plurality of panels comprising at least a first panel and an end panel, said first edge of one of said plurality of panels is pivotably connected to said second edge of one of said plurality of panels consecutively until all of said plurality of panels are pivotably connected, wherein said first edge of said first panel and said second edge of said end panel remain unconnected to said plurality of panels, and wherein said first edge of said first panel defines a first end to said plurality of panels and said second edge of said end panel defines a second end to said plurality of panels;
   b. a connecting flap, said connecting flap pivotably connected to said first edge of said first panel;
   c. first fastening means carried by said connecting flap for removably attaching said connecting flap to said plurality of panels, wherein said plurality of panels may be folded and secured by said connecting flap to form a multitude of shapes to accommodate the shape and size of the retained cargo;
   d. second fastening means carried by said bottom edge of said plurality of panels for removably attaching said plurality of panels to the cargo space of the vehicle; and
   e. an outer layer of carpet carried on said plurality of panels, wherein said first fastening means of said connecting flap is connected to said outer layer of carpet to secure said device in one of a multitude of shapes.

18. The device of claim 17, wherein said plurality of panels are made from a material selected from the group consisting of cardboard, paper, plastic, wood, pressed board, chip board, and metal.

19. The device of claim 17, wherein said plurality of panels are formed by fold lines creased in a single sheet of material.

20. The device of claim 18, wherein said plurality of panels are connected by hinges.

* * * * *